Oct. 6, 1942.   H. F. HEILEMAN   2,297,888
PRICE TAG INDICATOR
Filed July 10, 1940
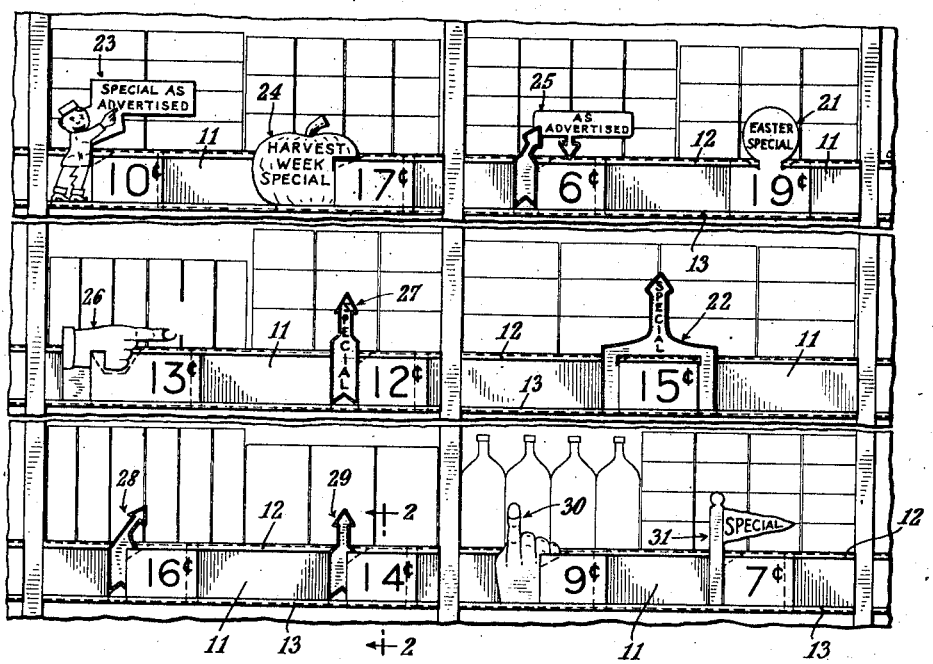
INVENTOR,
Herman F. Heileman
BY
his Attorney.

Patented Oct. 6, 1942

2,297,888

UNITED STATES PATENT OFFICE 2,297,888

PRICE TAG INDICATOR

Herman F. Heileman, Kenoza Lake, N. Y., assignor to The Wickersham Press, Inc., New York, N. Y., a corporation of New York Application July 10, 1940, Serial No. 344,649

3 Claims. (Cl. 40—16)

This invention relates generally to improvements in shelf price tags, and particularly to a device intended to call special attention to certain goods or merchandise upon store shelves, and to the prices of such goods or merchandise.

One of the objects of the present invention is to provide, in combination with a price tag, a complementary device adapted to be associated with such price tag.

Another object of this invention is to provide, in combination with the usual channel-shaped price tag support, secured to the edge of a shelf accommodating merchandise, a goods advertising or indicating device, which is adapted to be readily placed in such channel and to be associated in said channel with the usual price tag.

Another object of this invention is to provide a goods advertising or indicating device, in combination with a price tag, adapted to be secured within an existing price tag-holding channel, provided at the edge of a merchandise supporting shelf, and wherein the device consists of a channel-engaging portion and a goods indicating or advertising portion, forming a part of the former portion, and preferably extending sidewise of said channel-engaging portion, and in which device there is provided at the juncture between the channel engaging portion and the goods indicating portion, a substantially triangular cut-out for accommodating a part of the upper tag-holding member of the channel and for facilitating the placement of the usual price tag over the channel engaging portion of the device.

The foregoing and still further objects and advantages of the present invention will become more fully apparent from the ensuing description and the accompanying drawing, in which:

Fig. 1 is a fragmental illustration of a plurality of goods supporting shelves, equipped at their frontal edges with tag-receiving channels, with which latter several forms of my goods indicators are shown;

Fig. 2 is a typical sectional view through a shelf edge taken on line 2—2 of Fig. 1;

Fig. 3 is an enlarged illustration of my device, partially in section, showing the combination between the tag-supporting channel, a goods indicator and a price tag;

Fig. 4 illustrates a price tag as employed in Fig. 3;

Figs. 5, 6, 7 and 8 show various constructions of cut-outs provided in my indicator.

Referring now specifically to the figures, numeral 10 denotes the body of a merchandise supporting shelf, at the front edge of which is secured a price tag-holding channel 11, having upper and lower tag-holding members 12 and 13.

My goods indicator, such as clearly shown in Figs. 3, 5, 6, 7 and 8, consists of a channel engaging portion 14, and a goods indicator or goods advertising portion 15, which two portions form integral parts of one another. At the juncture between the two portions is provided at least one cut-out 16 of a substantially triangular configuration, such as shown in Figs. 3, 5 and 6.

In the modified forms illustrated in Figs. 7 and 8, two such cut-outs 17 and 18, and 19 and 20, are indicated. Goods indicating portion 15 of all of my devices is intended to substantially extend above the upper edges, both of channel 11 and of shelf 10, while the channel engaging portion is placed with its upper and lower edges into the tag-holding members 12 and 13 of the channel. Cut-outs 16 to 20 are intended to facilitate the insertion of the channel engaging portion of my device into the channel, and to clear a part of the upper tag-holding member 12. At the same time the cut-outs permit the goods indicator portion to overlie the upper tag holding member 12 and to extend above the channel.

In most of the embodiments of my device the goods indicating portion extends sidewise from the channel engaging portion. However, in Figs. 7 and 8 there are shown modifications wherein the goods indicating portion of my device, denoted at 15' and 15", extends from the upper edge of the channel engaging portion. These constructions apply to the device indicated at 21 and 22 at the right-hand half of Fig. 1, while the usual construction, with the goods indicating portion shown extending sidewise, are denoted at 23, 24, 25, 26, 27, 28, 29, 30 and 31.

The cut-outs in all of the devices are designed to facilitate the placement, over the channel engaging portion of my device, of the usual replaceable price tag carried by the channel. The price tag is intended to more securely hold my device in place. Inasmuch as all of my devices are entirely independent from the price tags, they may be positioned at any place of the channel, and may be arranged at any desired combination with price tags of different denominations.

From the illustration in Fig. 1 it becomes quite obvious that the shape, design, dimensions, printed matter, coloring and other features of the goods indicating portion of my device may be chosen to suit any particular requirements, and that consequently changes in construction or improvements may become necessary, and I therefore reserve for myself the right to make such changes and improvements, without departing from the broad scope of my invention, as defined in the annexed claims.

I claim:

1. The combination of a tag channel, a goods indicator and a price tag, said goods indicator and said price tag being removably associated with said channel, said goods indicator comprising channel engaging and channel clearing portions, the latter portion extending sidewise from said former portion and being adapted to project substantially above the upper edges of the channel, said channel engaging portion being provided with at least one cut-out at its junction with said channel clearing portion, said removable price tag covering said cut-out and said channel engaging portion and holding the latter securely in the channel, said cut-out serving for accomodating a substantial corner portion of the price tag to facilitate its direct engagement with the channel, the latter being adapted to be attached to a goods-supporting shelf.

2. In a goods and price indicating device for shelf-supported merchandise, the combination of a tag channel, adapted to be secured to a goods-supporting shelf, a goods indicator and a price tag, both latter instrumentalities being detachably associated with said channel, said indicator having integral goods-indicating and channel engaging portions, said channel engaging portion having a cut-out and being adapted to be associated with the upper and lower edges of the channel, said cut-out being located at the place of junction between said goods indicating and said channel engaging portions and constituting a free space of a relatively large area, said goods indicating portion being adapted to extend substantially above the upper edge of the channel and a price tag superimposed over said channel engaging portion and extending with a substantial corner area through said cut-out into the channel, thereby providing an unrestricted engagement of said corner area directly with said channel.

3. In a goods and price indicating device for shelf-supported merchandise, the combination of a tag holding channel adapted to be secured to a goods-supporting shelf, a goods indicator and a price tag, both latter instrumentalities being removably associated with said channel, said indicator comprising integral channel engaging and goods indicating portions, provided at their junction with at least one, substantially large approximately triangular cut-out, which latter effectively separates the two portions over a substantial area of their junction, said goods indicating portion being so dimensioned that it substantially extends above the upper edge of the channel, said price tag being superimposed over the channel engaging portion of the goods indicator, said cut-out in the latter facilitating the placement into the cut-out area of a substantial corner portion of the price tag so that the latter directly engages the channel, and covers the full area of the cut-out, thereby holding the goods indicator against movement in the channel.

HERMAN F. HEILEMAN.